US007299959B2

(12) United States Patent
Ishizawa et al.

(10) Patent No.: US 7,299,959 B2
(45) Date of Patent: Nov. 27, 2007

(54) URGED MAGAZINE FOR A FASTENER DRIVING TOOL

(75) Inventors: Yoshinori Ishizawa, Ibaraki (JP); Hiroki Kitagawa, Ibaraki (JP); Masashi Nishida, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/178,508

(22) Filed: Jul. 12, 2005

(65) Prior Publication Data

US 2006/0011695 A1 Jan. 19, 2006

(30) Foreign Application Priority Data

Jul. 14, 2004 (JP) .......................... P2004-207945

(51) Int. Cl.
*B65G 25/04* (2006.01)
*B25C 5/06* (2006.01)

(52) U.S. Cl. ...................... 227/120; 227/119; 227/125; 227/127

(58) Field of Classification Search ................ 227/120, 227/119, 125, 127, 126, 128, 147, 149, 8
See application file for complete search history.

(56) References Cited

U.S. PATENT DOCUMENTS

| | | | | | |
|---|---|---|---|---|---|
| 4,463,888 | A * | 8/1984 | Geist et al. | ................. | 227/109 |
| 4,524,896 | A * | 6/1985 | Morrell, Jr. | ................. | 227/126 |
| 4,624,401 | A * | 11/1986 | Gassner et al. | ............. | 227/125 |
| 5,975,399 | A * | 11/1999 | Oehri et al. | ................ | 227/120 |
| 6,237,747 | B1 * | 5/2001 | Gantner et al. | ............. | 198/747 |
| 6,443,348 | B2 * | 9/2002 | Lamb | ............................ | 227/8 |
| 6,938,809 | B1 * | 9/2005 | Schnell | .......................... | 227/8 |
| 7,040,522 | B2 * | 5/2006 | Osuga et al. | ............... | 227/119 |

FOREIGN PATENT DOCUMENTS

JP 2002-273669 9/2002

* cited by examiner

*Primary Examiner*—Brian D. Nash
(74) *Attorney, Agent, or Firm*—Mattingly, Stanger, Malur & Brundidge, P.C.

(57) ABSTRACT

A magazine cover is integrally molded with a return-preventing claw part to be engaged with a fastener loaded into a guide part. The return-preventing claw part is so constructed as to include: a return preventing surface that abuts against the fastener to prevent the fastener from moving to a loading port; and a support portion that always makes the return preventing surface abut against the fastener, thereby being deformed, to support the return preventing surface such that the return preventing surface can be retracted to a position where the return preventing surface does not abut against the fastener.

6 Claims, 10 Drawing Sheets

URGED MAGAZINE FOR A FASTENER DRIVING TOOL

BACKGROUND OF THE INVENTION

1. Field of the Invention

The present invention relates to a fastener driving tool for driving a fastener such as a nail into a mate material by the use of compressed air or combustion gas and, in particular, to the structure of a magazine for accommodating and supplying a fastener.

2. Description of the Related Art

A fastener driving tool described in JP-A-2002-273669 will be described with reference to FIG. 11 to FIG. 13.

A magazine cover 2, which is made of plastic resin and is fixed to the rear end of a magazine 5, has a nail loading port 15 formed in a shape expanding to an entrance side such that a nail 6 can be easily loaded. Moreover, to prevent the loaded nail 6 from being pushed back to the nail loading port 15 along with a feeder 10 when the feeder 10 is pulled up to the nail loading port 15, a return-preventing claw part 3 for preventing a nail from returning in the direction opposite to a direction in which the nail is fed is fixed to the magazine 5 by a screw 4. The return-preventing claw part 3 is made by forming a thin steel plate by a press.

The magazine cover 2 and the return-preventing claw part 3 are constructed of separate parts and the return-preventing claw part 3 is fixed to the magazine 5 by the screw 4. In the return-preventing claw part 3, as shown in FIG. 12 and FIG. 13, a portion opposite to the nail loading port 15 is bent and protruded toward the front in FIG. 11.

SUMMARY OF THE INVENTION

In the construction described in JP-A-2002-273669, two parts of a magazine cover made of plastic resin and a return-preventing claw part made of steel, which are different from each other in the material and the manufacturing method, need to be mounted on the rear end of the magazine while the two parts are being pushed at the same time. Hence, it has been required to reduce the cost of parts and the number of man-hours required to assemble the parts. Moreover, there is presented a problem that when the return-preventing claw part is pushed by the finger at the time of taking the nail out of the magazine, the end surface 3*b* of a thin steel plate abuts against the hand to cause discomfort.

The object of the present invention is to provide a fastener driving tool, which resolves the above conventional defects and is provided with a return-preventing claw part of good operability, at a low price.

In a fastener driving tool of the type including: a driver blade for driving a fastener such as a nail; a nose portion for guiding the driver blade; a magazine that has a guide portion for guiding the fastener toward the nose portion, a feeder for pushing the fastener toward the nose portion, and a spring for pressing the feeder toward the nose portion, and supplies the fastener to the nose portion; and a magazine cover provided on an end portion opposite to the nose portion and having a loading port for loading the fastener into the guide portion, the fastener driving tool is constructed such that the magazine cover is integrally formed with a return-preventing claw part to be engaged with the fastener loaded in the guide portion and that the return-preventing claw part has: a return-preventing surface that abuts against the fastener to prevent the fastener from moving to the loading port; and a support portion that always makes the return preventing surface abut against the fastener, thereby being deformed, to support the return preventing surface such that the return preventing surface can be retracted to a position where the return preventing surface does not abut against the fastener.

Further, the return-preventing claw part is molded in the shape of a nearly quadrangular pyramid whose sectional area becomes larger toward its base to the magazine cover.

Still further, a length in the direction in which the fastener is fed of the return-preventing claw part is set at 4 or more times the mean value of a width at the base to the magazine cover of the return-preventing claw part and a width of the abutting surface of the return-preventing claw part.

Still further, the return-preventing claw part has a positioning portion formed in a protruding manner on the retracting side of the return-preventing claw part.

According to the construction as claimed in claim 1, it is possible to reduce the number of parts.

According to the construction as claimed in claim 2 and claim 3, it is possible to provide a return-preventing claw part of good operability and of high strength.

According to the construction as claimed in claim 4, it is possible to provide a return-preventing claw part that has its return prevention function not impaired even if the return-preventing claw part is warped when it is molded.

Therefore, it is possible to provide a fastener driving tool provided with a return-preventing claw part of good operability at a low price.

DETAILED DESCRIPTION OF THE PREFFERED EMBODIMENTS

A fastener driving tool in accordance with the embodiment of the present invention will be described with reference to FIG. 1 to FIG. 10.

A magazine 5 will be described with reference to FIG. 10.

Figure 10:
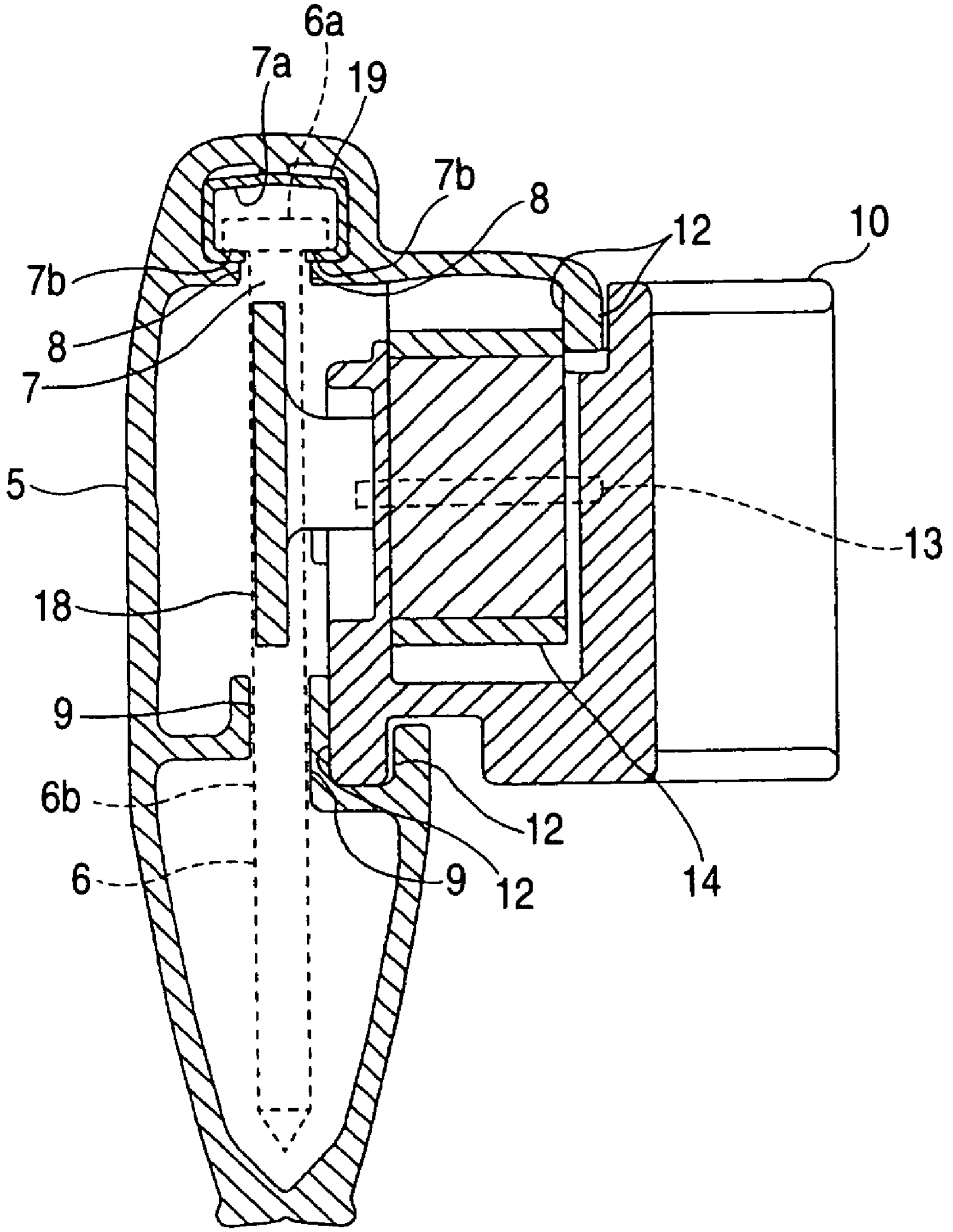
FIG. 10 is a sectional view taken on a line B-B in FIG. 2.
Figure 11:
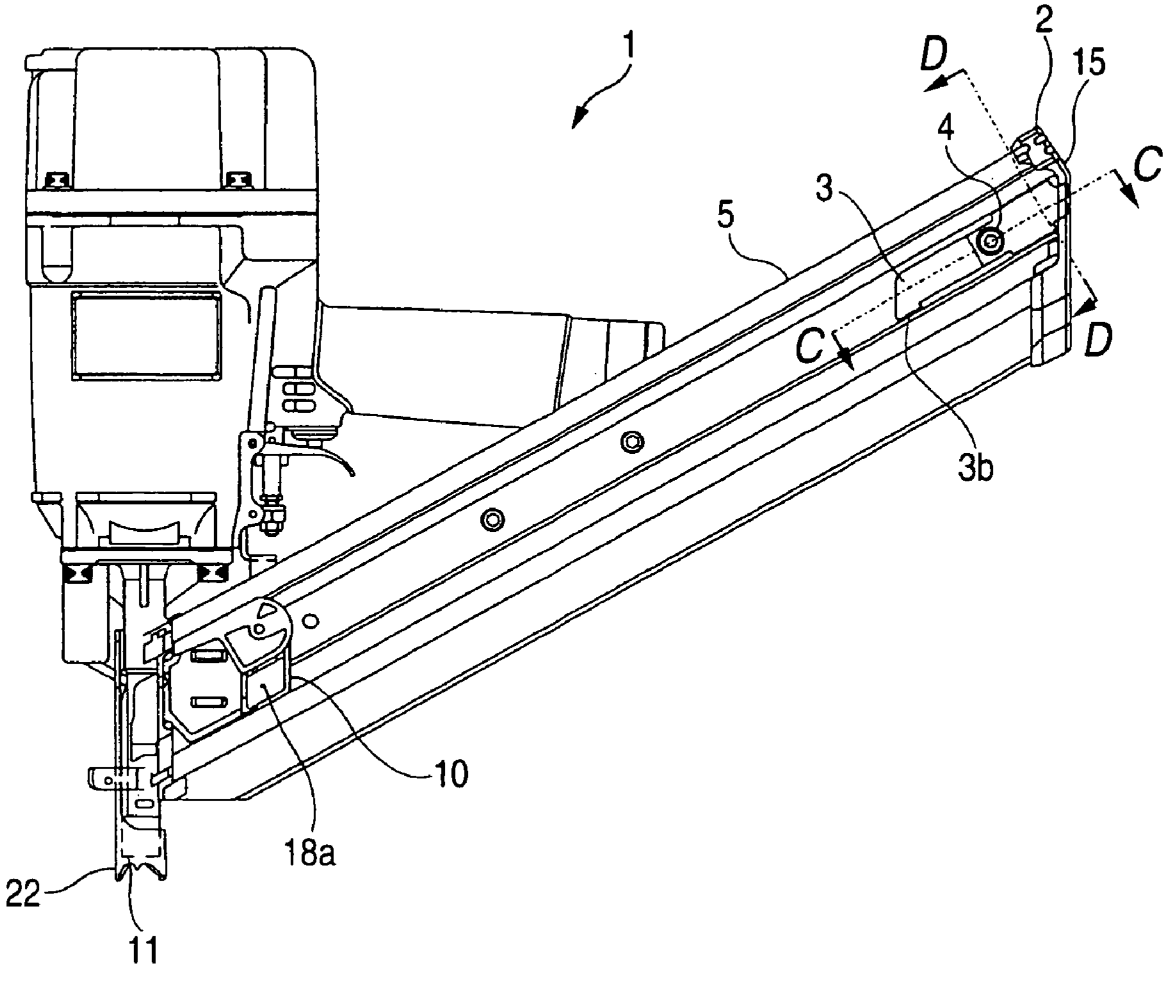
FIG. 11 is a front view of a conventional fastener driving tool.
Figure 12:
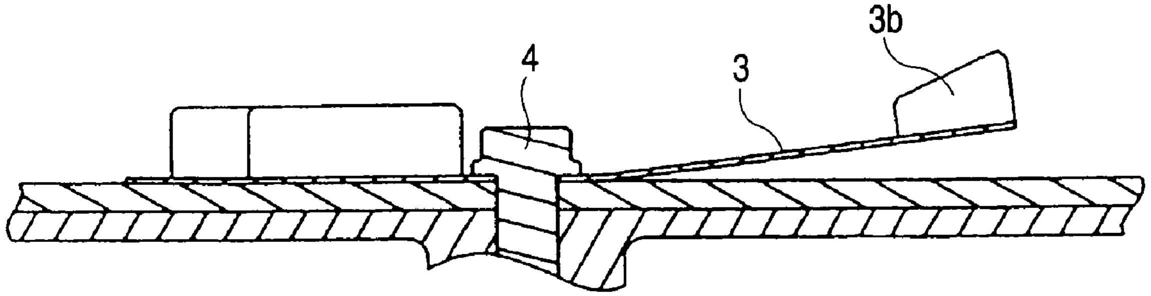
FIG. 12 is a sectional view taken on a line C-C in FIG. 11.
Figure 13:
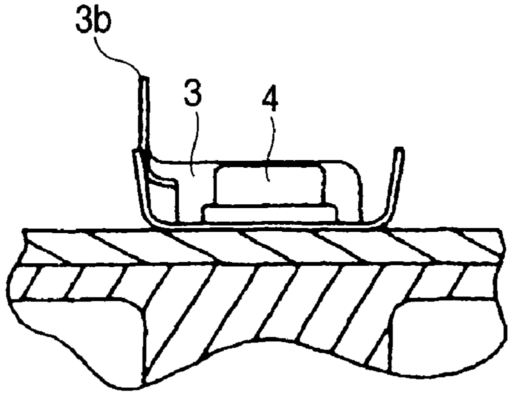
FIG. 13 is a sectional view taken on a line D-D in FIG. 11.

In FIG. 10, in the up direction, the upper side of a nail head 6*a* is held by the top surface 7*a* of a guide groove 7 and in the down direction, the lower side of the nail head 6*a* is held by the bottom surface 7*b* of both sides of the guide groove 7. In the lateral direction, the upper portion of the nail 6 is held by a guide (A) 8 just below the bottom surface 7*b* and the lower portion of the nail 6 is held by a guide (B) 9 which is formed nearly in the center of the magazine 5.

The magazine 5 has guide walls 12 provided at two upper and lower positions and for guiding a feeder 10 in such a way as to slide the feeder 10 in the direction of a nose portion 11. The feeder 10 is constructed of: a feeder spring 14 having a rotary shaft 13 in a direction perpendicular to a nail axis 6*b* so as to push the nail 6 in the direction of the nose portion 11; and a feeder (A) 18 having a structure in which: it directly pushes the nail 6; when the nail 6 is loaded from the nail loading port 15 formed in the rear end of the magazine 5 and then the feeder 10 is pulled up to the nail loading port 15, it is turned around a rotary shaft 13 by the loaded nail 6, thereby being retracted from the guide groove 7; and when it climbs over the nail 6, it is again protruded into the guide groove 7 by the pressing force of a spring 17.

The magazine 5 of this structure is extruded of nonferrous metal such as aluminum and magnesium. Since both sides of the guide groove 7 in which the nail heads 6*a* pass is easily worn, a nail rail 19 made of metal is inserted into the magazine 5.

A magazine cover 2 and a return-preventing claw part 3 will be described with reference to FIG. 3 to FIG. 9.

The magazine cover 2 is made of plastic resin of a flexible material and is integrally molded with the return-preventing claw part 3. The return-preventing claw part 3 has a support portion 3*d* extending from near the nail loading port 15 to the nose portion 11, an abutting surface 3*a* formed on an end portion of the support portion 3*d* and located on the side of the nose portion 11. A gap 38 is formed between the return-preventing claw part 3 and a wall 37 formed on the inside surface of the magazine cover 2 so that when the nail 6 is inserted, the support portion 3*d* can retract toward the wall 37 in the shape shown by broken line and in the direction shown by arrow in FIG. 6. Moreover, the return-preventing claw part 3 is formed in the shape of a nearly quadrangular pyramid whose sectional area increases in the direction of a mounting portion so that the stress of the return-preventing claw part 3 becomes constant when the support portion 3*d* retracts.

When plastic resin is molded into the shape of a slender quadrangular pyramid, the plastic resin is warped because the percentage of contraction of a portion having a large thickness after it is molded is larger than that of a portion having a small thickness. In the present invention, a positioning portion 39 is molded in a protruding manner on a side surface opposed to the wall 37 of the support portion 3*d* in such a way as to provide an extremely small gap between the side surface and the wall 37. With this, the positioning portion 39 becomes large in the percentage of contraction and hence the support portion 3*d* is warped toward the wall 37. Further, the positioning portion 39 is molded in a protruding manner in such a way as to provide the extremely small gap between itself and the wall 37 before it is contracted. With this, when the support portion 3*d* is warped toward the wall 37, the positioning portion 39 abuts against the wall 37 to prevent the support portion 3*d* from being bent to excess. If the abutting surface 3*a* is so set as to abut against the nail 6 in a state where the positioning portion 39 abuts against the wall 37, even if the support portion 3*d* is warped, the function of the return-preventing claw part 3 is not impaired.

Figure 5:
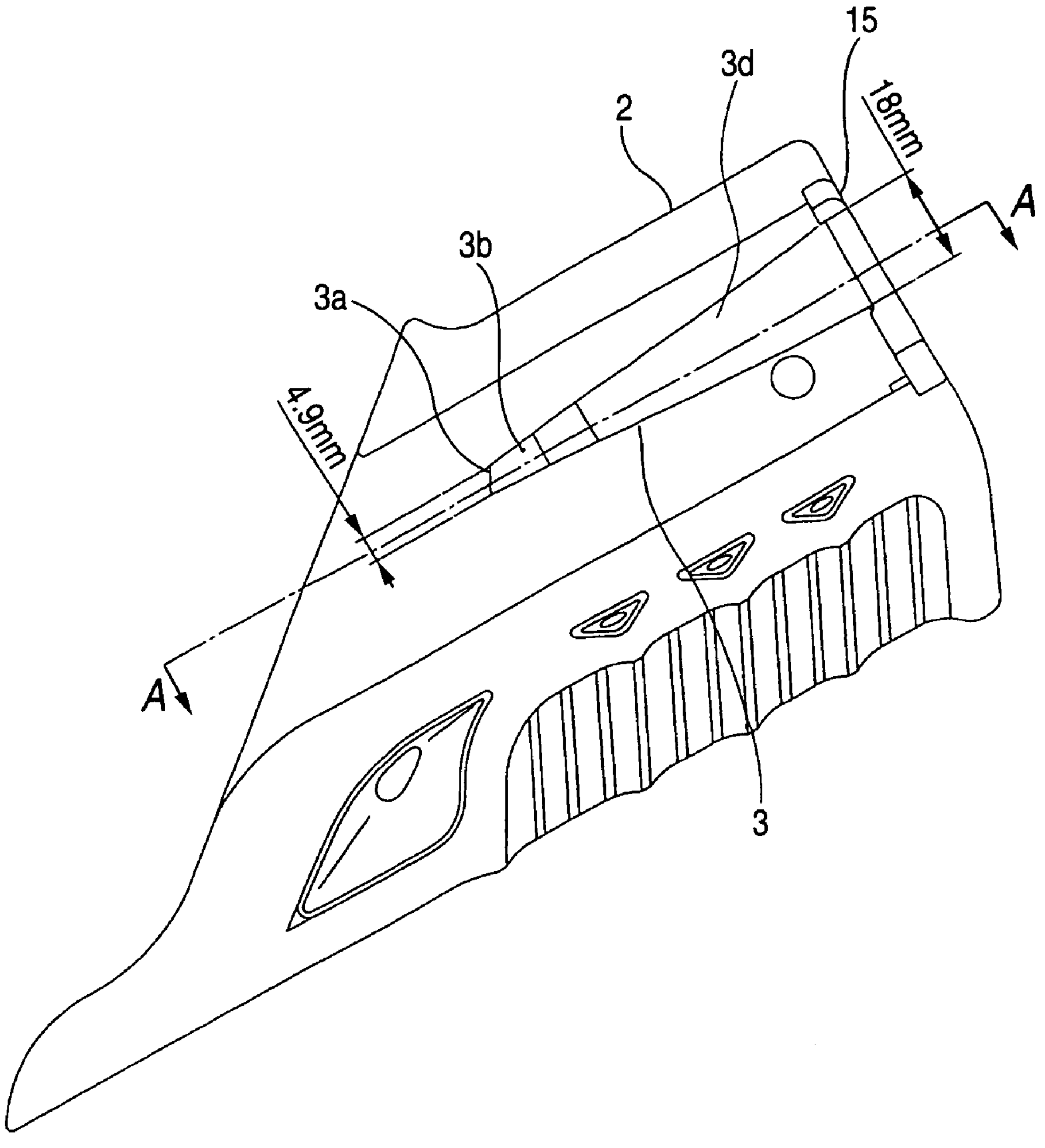
FIG. 5 is a front view of the vicinity of the magazine cover of the fastener driving tool in accordance with the embodiment of the present invention.
Figure 6:
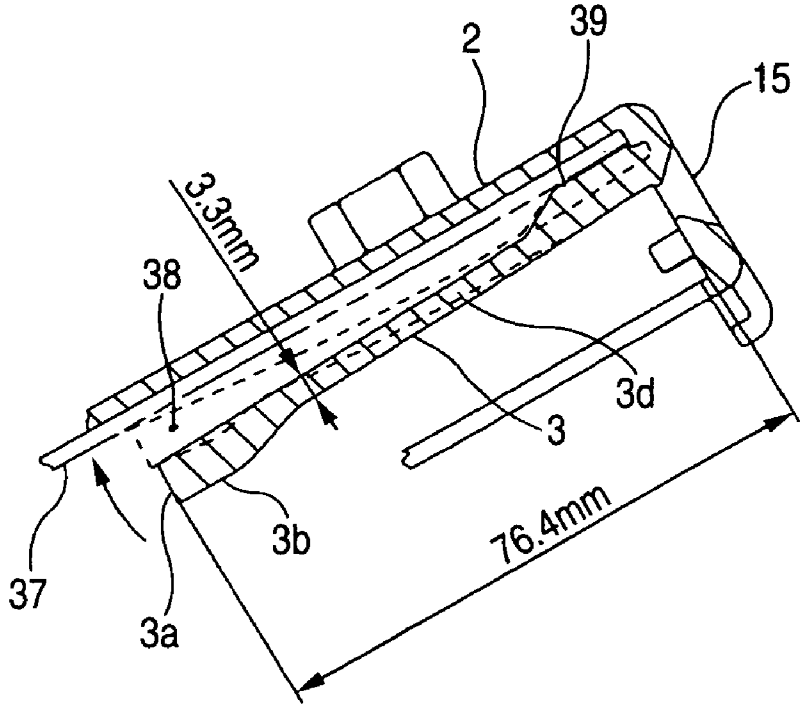
FIG. 6 is a sectional view taken on a line A-A in FIG. 5.

If the return-preventing claw part 3 is so set as to be formed in a slender shape, it is easily deformed and hence becomes better in operability but becomes smaller in strength. At to specific sizes in this embodiment, as shown in FIG. 5 and FIG. 6, the length (76.4 mm) in the direction in which the nail 6 is fed of the return-preventing part 3 is approximately 4.2 times the width (18 mm) at the base to the magazine cover 2 of the return-preventing claw part 3. Moreover, the length (76.4 mm) in the direction in which the nail 6 is fed of the return-preventing part 3 is approximately 15.6 times the width (4.9 mm) at the abutting surface 3*a* of the return-preventing claw part 3. Since the return-preventing claw part 3 is molded in the shape of the nearly quadrangular pyramid, the mean value of width of the return-preventing claw part 3 becomes the mean value of the width (18 mm) at the base to the magazine cover 2 of the return-preventing claw part 3 and the width (4.9 mm) at the abutting surface 3*a* of the return-preventing claw part 3 and hence becomes approximately 11.5 mm. The length (76.4 mm) in the direction in which the nail 6 is fed of the return-preventing part 3 is approximately 6.6 times the above mean value (approximately 11.5 mm). An experiment reveals that if this ratio is 5 times or more, the return-preventing claw part 3 is easily deformed to an appropriate extent and can also secure sufficient strength.

The finger touch surface 3*b* of the return-preventing claw part 3 for taking the nails 6 out of the magazine 5 is molded in a flat plane and hence return-preventing claw part 3 can be operated without discomfort.

A procedure of loading the nails 6 into the magazine 5 will be described.

Figure 1:
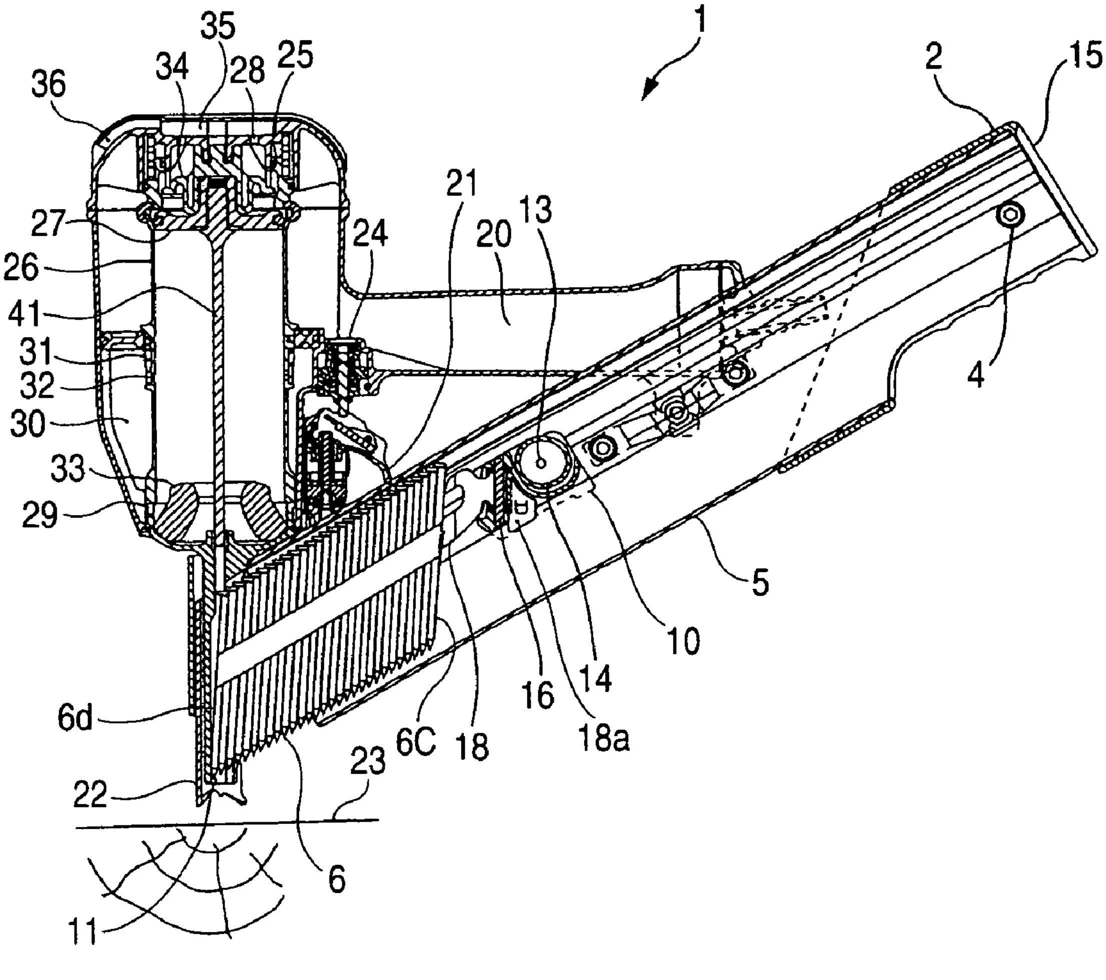
FIG. 1 is a sectional view of the general structure of a fastener driving tool in accordance with the embodiment of the present invention.
Figure 2:
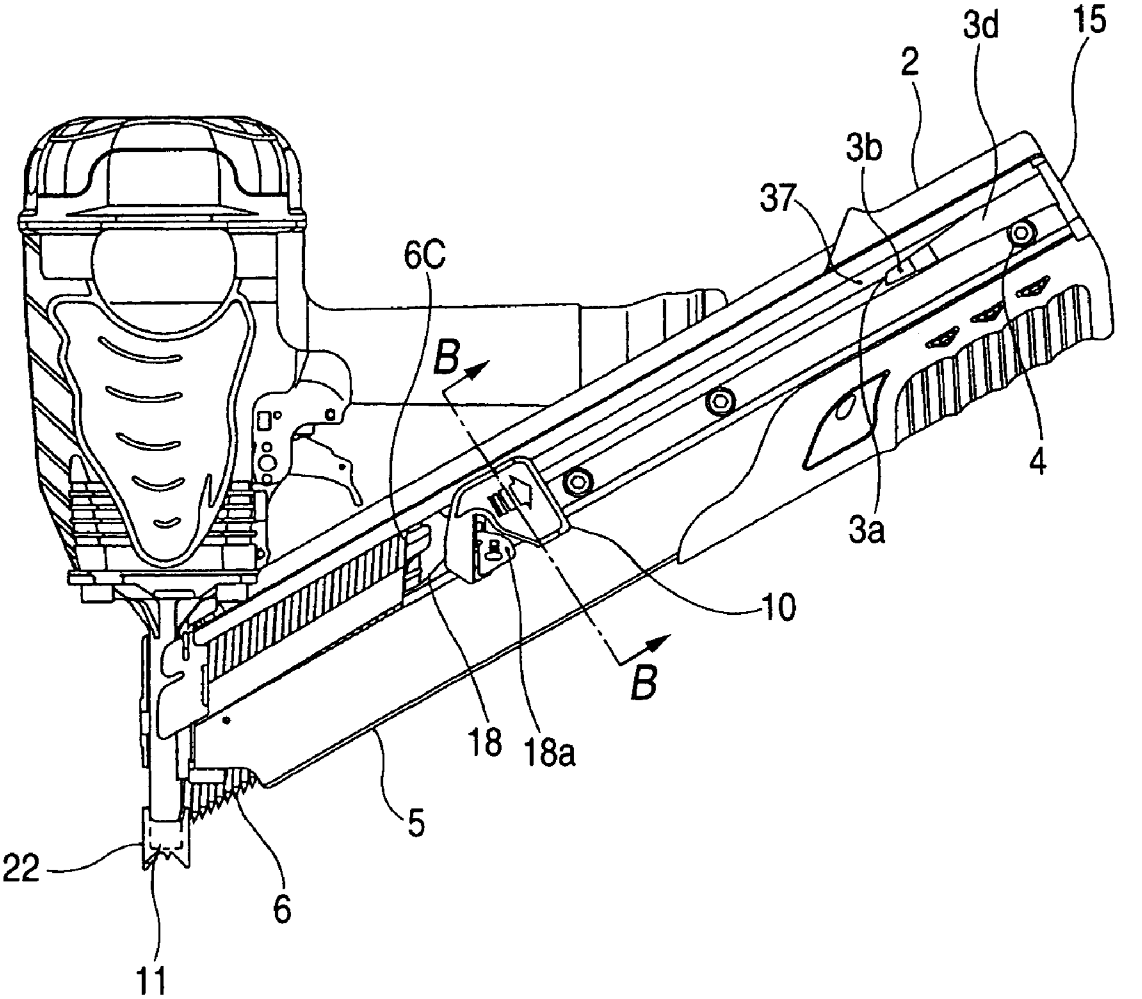
FIG. 2 is a front view of the fastener driving tool in accordance with the embodiment of the present invention.
Figure 3:
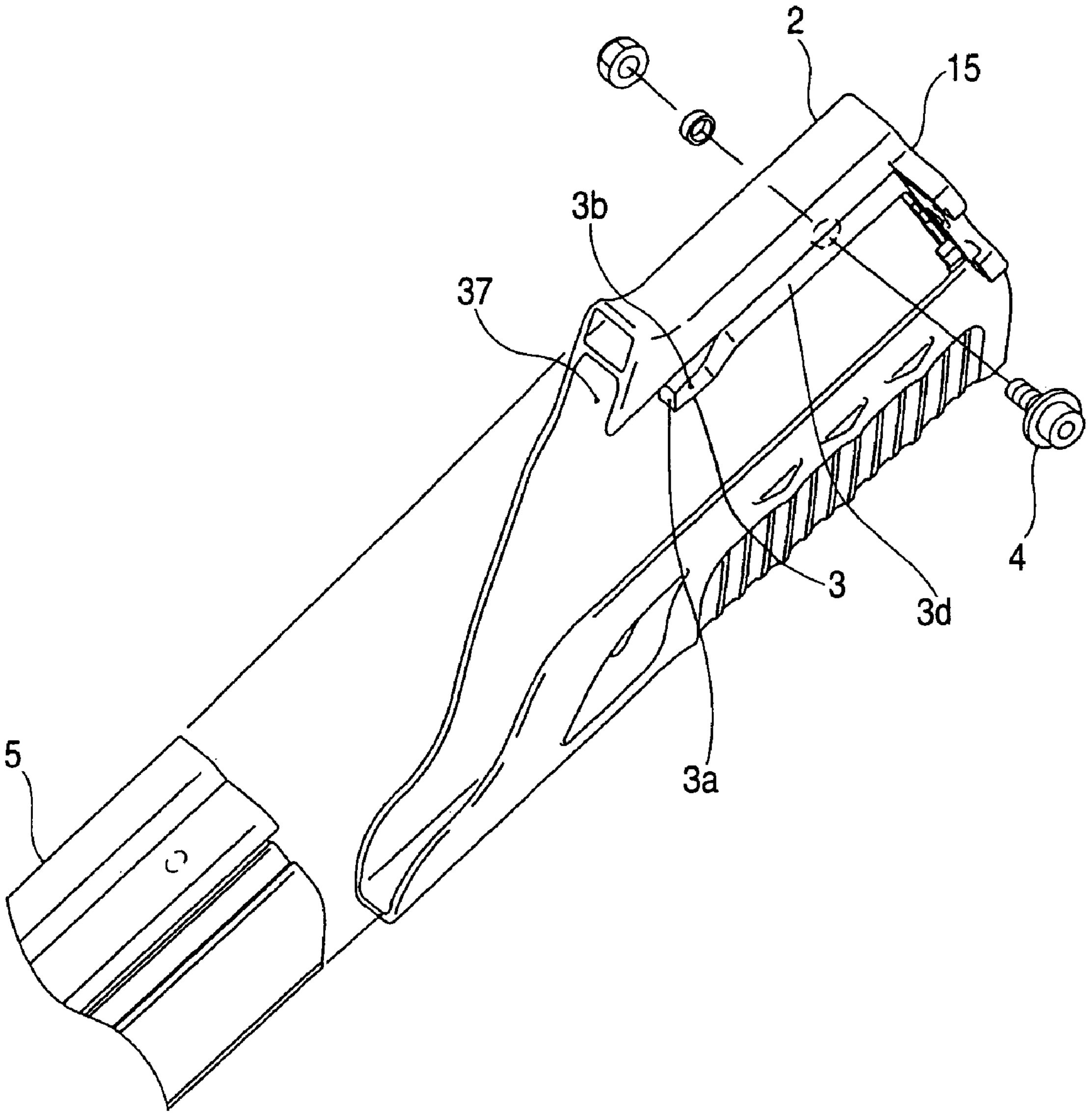
FIG. 3 is an exploded view in perspective showing a structure of the vicinity of the magazine cover of the fastener driving tool in accordance with the embodiment of the present invention.
Figure 4:
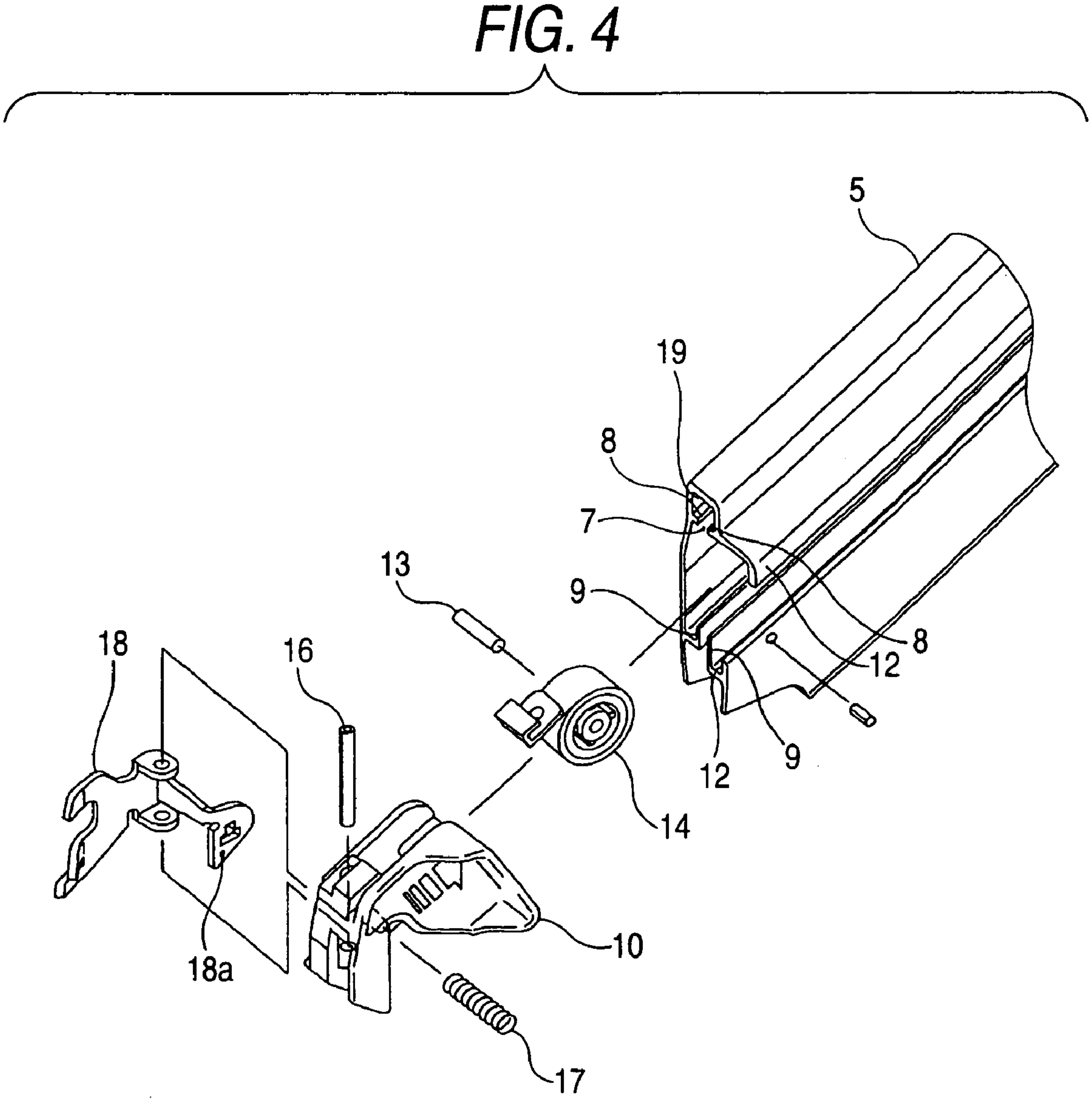
FIG. 4 is an exploded view in perspective showing a structure of the vicinity of the feeder of the fastener driving tool in accordance with the embodiment of the present invention.
Figure 7:
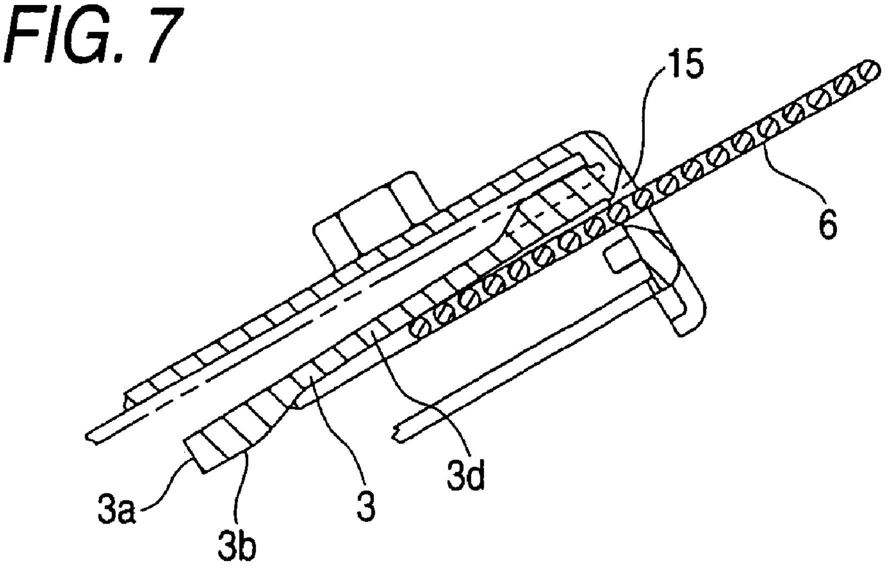
FIG. 7 shows a state before nails climbing over a return-preventing claw part in the sectional view taken on a line A-A in FIG. 5.
Figure 8:
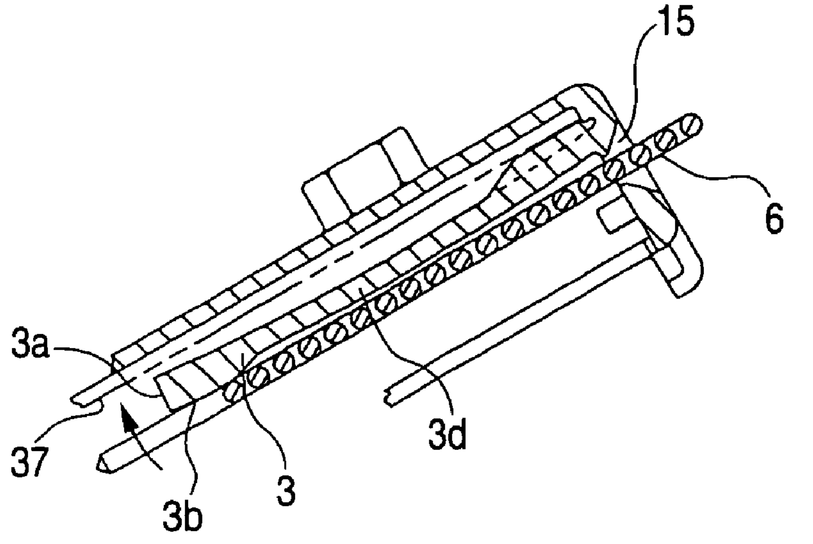
FIG. 8 shows a state when the nails climb over the return-preventing claw part in the sectional view taken on a line A-A in FIG. 5.
Figure 9:
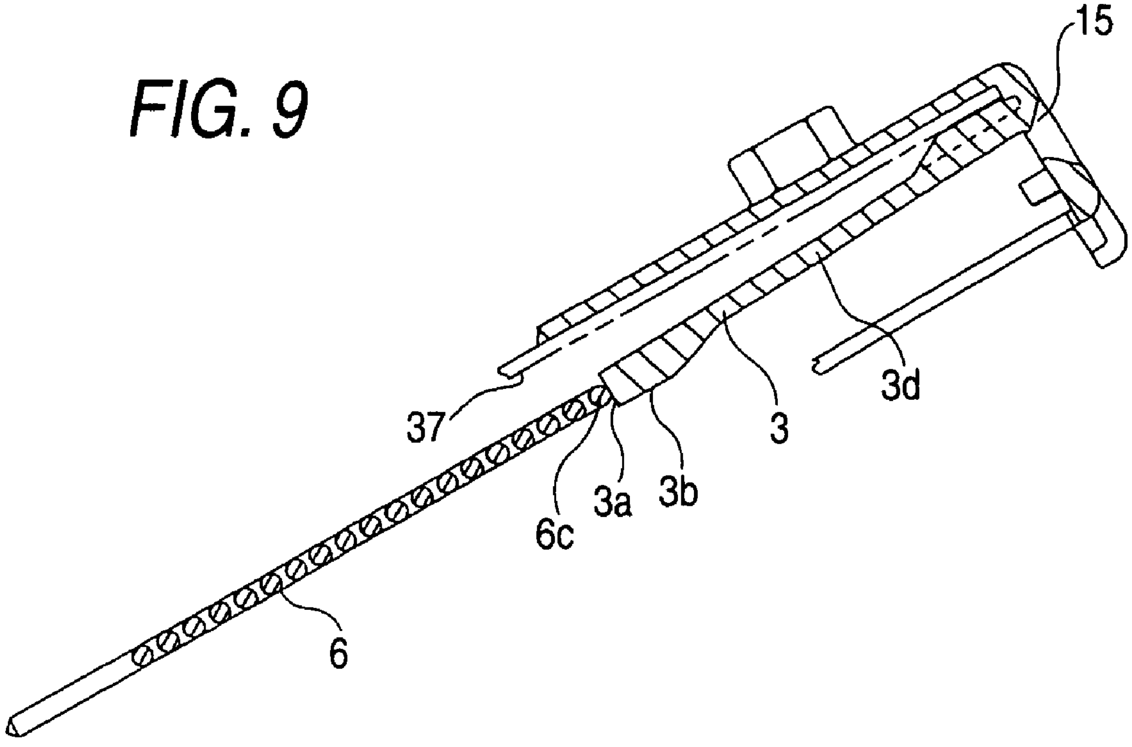
FIG. 9 shows a state where the nails are prevented from returning by the return-preventing claw part in the sectional view taken on a line A-A in FIG. 5.

As shown in FIG. 7, the nails 6 are inserted into the nail loading port 15 that is open in the rear end surface of the magazine 5. As shown in FIG. 8, the return-preventing claw part 3 is retracted toward the wall 37 by the inserted nails 6. When the feeder 10 is pulled up to the nail loading port 15, the feeder (A) 18 climbs over the nails 6 and retracts from the guide groove 7 against the pushing force of the spring 17 and hence the nails 6 are going to return to the nail loading port 15 by the frictional force between the feeder (A) 18 and the nails 6, but, as shown in FIG. 9, the last nail 6*c* is engaged with the return-preventing claw part 3, thereby being stopped. When the feeder 10 is further pulled up, the feeder (A) 18 climbs over the last nail 6*c* and again protrudes into the guide groove 7. When the hand is taken off, the feeder 10 is fed along with the nails 6 in the direction of nose portion 11 by the pushing force of the feeder spring 14, whereby the first nail 6*d* is loaded into the nose portion 11, as shown in FIG. 1.

A procedure of taking the nails 6 out of the magazine 5 will be described.

The release button 18*a* of the feeder (A) 18 is pressed to retract the feeder (A) 18 from the guide groove 7. The nails 6 are moved to the nail loading port 15 by the finger. Next, the finger touch surface 3*b* of the return-preventing claw part 3 is pressed by the finger to retract the return-preventing claw part 3 from the guide groove 7 and then the nails 6 are taken out of the nail loading port 15.

A driving action will be described.

The nails 6 are loaded into the magazine 5 as described above, and then an air hose (not shown) is connected to the fastener driving tool 1 to accumulate compressed air. The compressed air is accumulated in an accumulator chamber 20.

A piston 27 is quickly moved to a bottom dead center by the compressed air flowing into the upper side of the piston 27 in a cylinder 26 from the accumulator chamber 20, whereby a driver blade 41 coupled to the piston 27 hits the nail **6*d* to drive it into a wood 23. Air on the lower side of the piston 27 in the cylinder 26 flows through an air passage 29 into a return chamber 30 and when the piston 27 passes by an air passage 32 provided with a check valve 31 in the direction of the return chamber 30, part of compressed air on the upper side of the piston 27 passes through the air passage 32 to flow into the return chamber 30. The piston 27 is brought into contact with a piston bumper 33 at the bottom dead center, whereby the piston bumper 33** is deformed to absorb excess energy.

When a trigger 21 is returned or an operation of pushing a push lever 22 onto the wood 23 is stopped to turn off a trigger valve 24, a main valve 25 is moved toward the bottom dead center.

When the main valve 25 is closed, the connection between the accumulator chamber 20 and the upper side of the piston 27 in the cylinder 26 is interrupted and the upper side of the piston 27 in the cylinder 26 is made to connect with the atmosphere. The lower side of the piston 27 is pressed by the compressed air accumulated in the return chamber 30 to move the piston 27 quickly to a top dead center. The compressed air on the upper side of the piston 27 is passed through the air passage 28 and an expansion chamber 35 and is released into the atmosphere from an exhaust port 36. In this manner, the fastener driving tool 1 is returned to an initial state.

When this process is repeated, the connected nails 6 are driven into the wood 23 one after another.

What is claimed is:

1. A fastener driving tool comprising:

a driver blade for driving a fastener;

a nose portion for guiding the driver blade;

a magazine that has a guide portion for guiding the fastener toward the nose portion, a feeder for pushing the fastener toward the nose portion, and a spring for pressing the feeder toward the nose portion to thereby supply the fastener to the nose portion;

a magazine cover provided on an end portion opposite to the nose portion and having a loading port for loading the fastener into the guide portion, said magazine cover having a side wall extending along the guide portion in the direction of the nose portion; and a return-preventing member integrally connected with the side wall at one end thereof and extending in the direction of the nose portion, said return-preventing member including a first portion near the one end which is formed in contact with the side wall, a second portion extending from the first portion and being spaced from the side wall, and a third portion extending from the second portion and having an end surface, wherein the second and third portions of the return-preventing member are moved toward the side wall when the fastener is inserted from the loading port into the guide portion, and the end surface of the return-preventing member prevents the fastener from moving toward the loading port when the fastener is set at the guide portion of the magazine, and wherein the magazine cover is made of flexible material and is integrally molded with the return-preventing member.

2. The fastener driving tool as claimed claim 1, wherein the return-preventing member is molded in a shape of a nearly quadrangular pyramid whose sectional area becomes larger toward its base to the magazine cover.

3. The fastener driving tool as claimed in claim 2, wherein a length in a direction in which the fastener is fed of the return-preventing member is set at 4 or more times a mean value of two widths: a width at the base to the magazine cover of the return-preventing member, and a width of an abutting surface of the return-preventing member.

4. The fastener driving tool as claimed in claim 1, wherein the first portion of the return-preventing member has a positioning portion formed in a protruding manner near the one end thereof.

5. The fastener driving tool as defined in claim 1, wherein the first portion of the return-preventing member protrudes toward the side wall inside the magazine cover, so that the second and third portions of the return-preventing member are spaced from the side wall and are moved toward the side wall when the fastener is inserted from the loading port into the guide portion.

6. The fastener driving tool as defined in claim 1, wherein the third portion of the return-preventing member is thicker in a cross-section perpendicular to a surface of the side wall than the second portion of the return-preventing member.

* * * * *